US009634699B2

(12) United States Patent
Lee

(10) Patent No.: US 9,634,699 B2
(45) Date of Patent: Apr. 25, 2017

(54) APPARATUS FOR CONTROLLING WIDE-BAND SIGNAL TRANSMISSION GAIN IN WIRELESS COMMUNICATION SYSTEMS AND SIGNAL PROCESSING METHOD OF THE SAME

(71) Applicant: ELECTRONICS AND TELECOMMUNICATIONS RESEARCH INSTITUTE, Daejeon (KR)

(72) Inventor: Yong Su Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/042,145

(22) Filed: Feb. 11, 2016

(65) Prior Publication Data
US 2016/0241278 A1    Aug. 18, 2016

(30) Foreign Application Priority Data
Feb. 13, 2015    (KR) .................. 10-2015-0022363

(51) Int. Cl.
H04B 1/38    (2015.01)
H04B 1/04    (2006.01)
H04L 25/08    (2006.01)

(52) U.S. Cl.
CPC ........... *H04B 1/0475* (2013.01); *H04L 25/08* (2013.01); *H04B 2001/0425* (2013.01)

(58) Field of Classification Search
CPC .... H04M 11/06; H04M 11/062; H04B 1/0475
USPC ............ 375/222, 146, 298; 455/552.1, 550.1
See application file for complete search history.

(56) References Cited

U.S. PATENT DOCUMENTS

| 7,953,165 | B2 | 5/2011 | Kim et al. | |
|---|---|---|---|---|
| 8,422,465 | B2 | 4/2013 | Lee et al. | |
| 2004/0179629 | A1 | 9/2004 | Song et al. | |
| 2010/0166124 | A1* | 7/2010 | Behrens | H04B 1/0003 375/344 |
| 2013/0094522 | A1* | 4/2013 | Moshfeghi | H04W 88/06 370/498 |
| 2016/0014705 | A1* | 1/2016 | Tani | H04B 7/15535 370/252 |
| 2016/0192297 | A1* | 6/2016 | Kim | H04W 52/42 455/522 |

FOREIGN PATENT DOCUMENTS

| KR | 10-2004-0056800 A | 7/2004 |
|---|---|---|
| KR | 10-2010-0069374 A | 6/2010 |

OTHER PUBLICATIONS

Seung-Hyun Cho et al., "Cost-effective Next Generation Mobile Fronthaul Architecture with Multi-IF Carrier Transmission Scheme", Optical Fiber Communications Conference and Exhibition (OFC), Mar. 9-13, 2014.

* cited by examiner

*Primary Examiner* — Khai Tran
(74) *Attorney, Agent, or Firm* — Rabin & Berdo, P.C.

(57) ABSTRACT

Disclosed are an apparatus for controlling a wide-band signal transmission gain, which differently applies a transmission gain by the unit of an intermediate frequency (IF) at a transmitting side of a wide-band multi-IF wireless communication system which can convert multiple baseband digital signals into IF signals and thereafter, multiplex and simultaneously transmit the converted IF signals and a signal processing method of the same.

10 Claims, 5 Drawing Sheets

APPARATUS FOR CONTROLLING WIDE-BAND SIGNAL TRANSMISSION GAIN IN WIRELESS COMMUNICATION SYSTEMS AND SIGNAL PROCESSING METHOD OF THE SAME

CROSS-REFERENCE TO RELATED APPLICATIONS

This application claims priority to and the benefit of Korean Patent Application No. 10-2015-0022363 filed in the Korean Intellectual Property Office on Feb. 13, 2015, the entire contents of which are incorporated herein by reference.

TECHNICAL FIELD

The present invention relates to an apparatus for controlling a wide-band signal transmission gain in wireless communication systems and a signal processing method of the same, and more particularly, to an apparatus for controlling a wide-band signal transmission gain, which differently applies a transmission gain by the unit of an intermediate frequency (IF) at a transmitting side of a wide-band multi-IF wireless communication system which can convert multiple baseband digital signals into IF signals and thereafter, multiplex and simultaneously transmit the converted IF signals and a signal processing method of the same.

BACKGROUND ART

In general, at a transmitting side of a wireless communication system, a digital to analog converter (DAC) apparatus is provided, and as a result, a function to convert a digital signal into an analog signal is performed. As such, when the digital signal is converted into the analog signal, since the DAC does not perform sampling with an ideal impulse signal but performs sampling in a sample and hold scheme, an amplitude of a frequency response is not flat and drops like a sync waveform as illustrated in FIG. 1.

In this case, like ① and ② of FIG. 1, in the case of a narrow-band signal having a relatively small bandwidth, attenuation does not frequently occur in a whole frequency band interval, but like ③, attenuation of several dB occurs in a wide-band signal having a large bandwidth.

As a result, a system in which a wide-band multi-IF signal is transmitted has a frequency response characteristic, in which when respective IF signals are sampled through the DAC, as the frequency becomes high, the amplitude of the signal is further attenuated.

SUMMARY OF THE INVENTION

The present invention has been made in an effort to provide a method and an apparatus which prevent frequency response characteristics of intermediate frequency signals from being attenuated even after a multi-intermediate frequency signal passes through a DAC.

An exemplary embodiment of the present invention provides an apparatus for controlling a wide-band signal transmission gain, including: a baseband processor generating a plurality of baseband digital signals and outputting the generated baseband digital signals by controlling gains of the generated baseband digital signals; a multi-IF converter converting the plurality of baseband digital signals output from the baseband processor into digital IF signals and multiplexing the converted digital IF signals and outputting the multiplexed digital IF signals; and a digital-to-analog converter converting the multiplexed digital IF signals output from the multi-IF converter into analog IF signals.

Another exemplary embodiment of the present invention provides a signal processing method of an apparatus for controlling a wide-band signal transmission gain, including: generating a plurality of baseband digital signals; controlling gains of the plurality of generated baseband digital signals; converting the baseband digital signals having the controlled gains into digital IF signals; multiplexing the converted digital IF signals; and converting the multiplexed digital IF signals into analog IF signals.

According to exemplary embodiments of the present invention, even after a multiple intermediate frequency signal passes through a DAC, frequency response characteristics of intermediate frequency signals are prevented from being attenuated.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
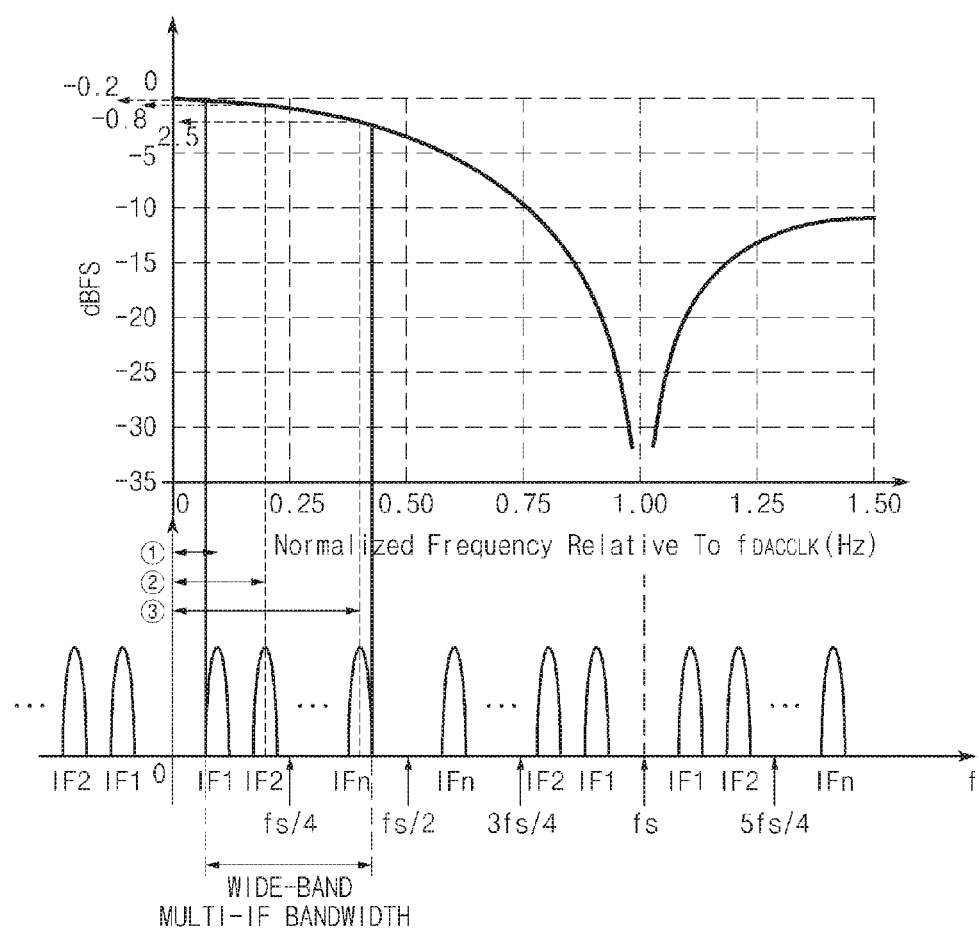
FIG. 1 is a diagram illustrating a frequency response characteristic depending on DAC sampling in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, preferred embodiments of the present invention will be described in more detail with reference to the accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner Therefore, configurations illustrated in the embodiments and drawings disclosed in the present specification are only the most preferred embodiment of the present invention and do not represent all of the technical spirit of the present invention, and thus it is to be understood that various equivalents and modified examples, which may replace the configurations, are possible when filing the present application.

Figure 2:
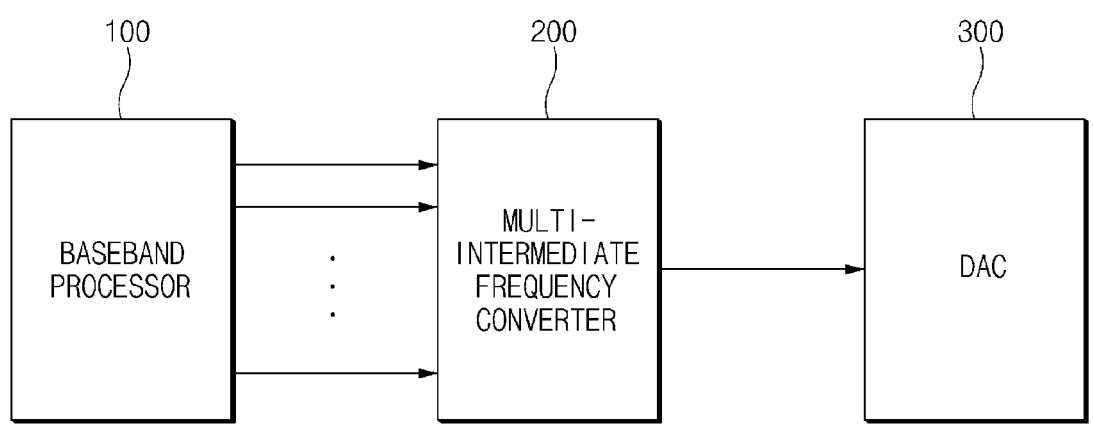
FIG. 2 is a configuration diagram illustrating a configuration of an apparatus for controlling a transmission gain according to an exemplary embodiment of the present invention.

FIG. 2 is a configuration diagram illustrating a configuration of an apparatus for controlling a transmission gain according to an exemplary embodiment of the present invention, which may be applied to a mobile front hole base station system configuring an intermediate frequency over fiber (IFoF) link for transmitting a multiple intermediate frequency (IF) signal.

The apparatus for controlling the transmission gain of FIG. 2 includes a baseband processor 100, a multiple intermediate frequency converter 200, and a digital to analog converter (DAC) 300.

The baseband processor 100 individually generates a plurality of digital signals which are baseband-processed and individually controls transmission gains for the plurality of baseband digital signals according to an amplitude characteristic of a frequency response depending on a sampling scheme of the digital-to-analog converter 300 and outputs the controlled transmission gains to the multiple intermediate frequency converter 200. That is, the amplitude characteristic of the frequency response depending on the sampling scheme of the digital-to-analog converter 300, that is, information on attenuation amounts for respective intermediate frequencies generated while the multiple intermediate frequency signal passes through the digital-to-analog converter 300 is configured in the baseband processor 100 and the baseband processor 100 individually preamplifies the respective baseband digital signals to correspond to an attenuation amount for each predetermined intermediate frequency and outputs the amplified digital signals to the multiple intermediate frequency converter 200.

The multi-IF converter 200 allocates different intermediate frequencies to the plurality of respective baseband digital signals output from the baseband processor 100 and converts the baseband digital signals into digital IF signals and multiplexes the converted digital IF signals and outputs the multiplexed digital IF signals to the digital-to-analog converter 300. That is, the multi-IF converter 200 generates a multiplexed IF wide-band signal to be output to the digital-to-analog converter 300.

The digital-to-analog converter (DAC) 300 converts the multiplexed digital IF signal (multi-IF signal) into an analog IF signal.

Figure 3:
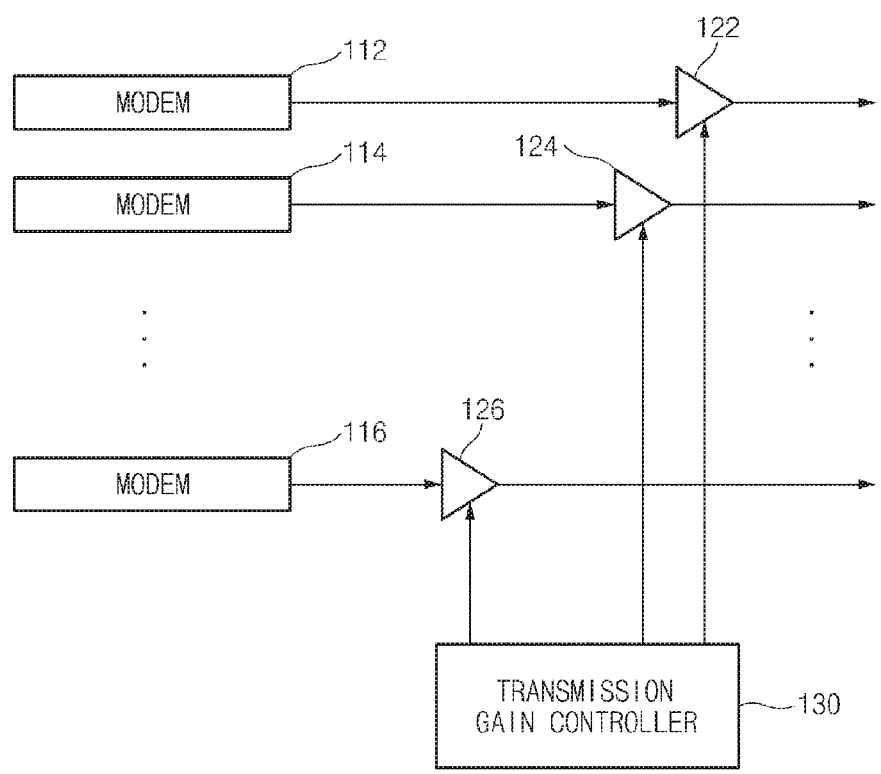
FIG. 3 is a configuration diagram illustrating, in more detail, a configuration of a baseband processor in FIG. 2.

FIG. 3 is a configuration diagram illustrating, in more detail, a configuration of a baseband processor 100 in FIG. 2.

The baseband processor 100 includes a plurality of modems 112, 114, . . . , 116, a plurality of amplifiers 122, 124, . . . , 126, and a transmission gain controller 130.

The plurality of modems 112, 114, . . . , 116 converts communication signals (subscriber signals) applied from subscribers into baseband digital signals, respectively and outputs the baseband digital signals.

The plurality of amplifiers 122, 124, . . . , 126 is provided to correspond to the plurality of modems 112, 114, . . . , 116 one to one and each of the amplifiers 122, 124, . . . , 126 amplifies the baseband digital signal output from each of the modems 112, 114, . . . , 116 corresponding thereto according to a gain control signal from the transmission gain controller 130 and outputs the amplified baseband digital signal to the multi-IF converter 20. That is, the amplifiers 122, 124, . . . , 126 digitally increase gains of the baseband digital signals corresponding thereto, respectively.

The transmission gain controller 130 generates gain control signals for individually controlling magnitudes of the baseband digital signals corresponding to the respective IFs according to an attenuation amount for each predetermined IF and outputs the generated gain control signals to the amplifiers 122, 124, . . . , 126. That is, the transmission gain controller 130 generates a gain control signal for previously increasing the magnitude of each baseband digital signal by an attenuation amount to correspond to the amount attenuated while the signal of each IF of the multiplexed digital IF signal output from the multi-IF converter 200 passes through the digital-to-analog converter 300 and outputs the generated gain control signal to the amplifiers 122, 124, . . . , 126. In this case, the attenuation amount for each IF as an amount attenuated while the digital IF signals pass through the DAC 300 due to an amplitude characteristic of a frequency response depending on a sampling scheme of the DAC is determined by a unique characteristic value of the DAC 300. Therefore, the attenuation amount for each IF may depend on the DAC 300 used in the wireless communication systems and is previously calculated and set at the time of designing the system.

Figure 4:
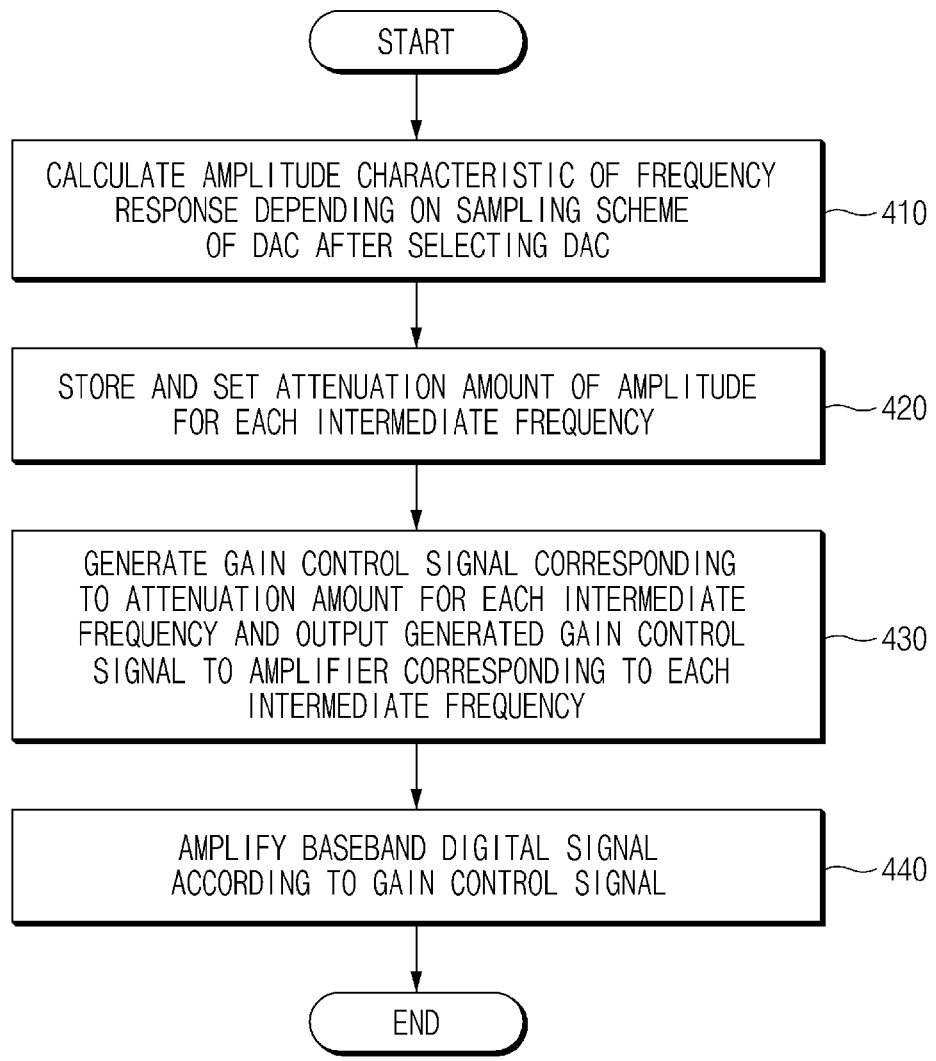
FIG. 4 is a flowchart for describing a method for controlling a transmission gain according to an exemplary embodiment of the present invention.

FIG. 4 is a flowchart for describing a method for controlling a transmission gain according to an exemplary embodiment of the present invention.

When the DAC 300 to be used in the apparatus for controlling the transmission gain of FIG. 3 is selected, the amplitude characteristic of the frequency response depending on the sampling scheme of the DAC 300 is calculated (step 410).

An attenuation amount of the magnitude (amplitude) of the digital IF signal is verified by the DAC 300 for each IF of the multi-IF converter 200 by using the amplitude characteristic of the frequency response calculated in step 410 to store and set information on the attenuation amount in a memory (not illustrated) (step 420).

For example, in the case of the frequency response illustrated in FIG. 1, representative values of frequency responses to IFs IF1, IF2, . . . , IFn are −0.2 dB, −0.8 dB, . . . , −2.5 dB, respectively. That is, it can be seen that digital IF signals having the IFs IF1, IF2, . . . , IFn are attenuated by 0.2 dB, 0.8 dB, . . . , 2.5 dB, respectively while passing through the DAC 300.

The attenuation amount for each IF by the DAC 300 is calculated and stored in advance.

When the wireless communication systems operate, the transmission gain controller 300 generates gain control signals for controlling magnitudes of baseband digital signals corresponding to the respective IFs IF1, IF2, . . . , IFn by using the information on the attenuation amount for each predetermined IF in step 420 and thereafter, outputs the generated gain control signals to amplifiers 122, 124, . . . , 126 corresponding thereto (step 430).

That is, gain control signals instructing the magnitudes of the baseband digital signals corresponding to the respective IFs IF1, IF2, . . . , IFn to be amplified by the corresponding attenuation amount according to the attenuation amounts of the respective IFs IF1, IF2, . . . , IFn attenuated by the DAC 300 are applied to the respective amplifiers 122, 124, . . . , 126.

The amplifiers 122, 124, . . . , 126 that receive the gain control signals from the transmission gain controller 130 amplify the input baseband digital signals according to the gain control signals to increase gains and thereafter, outputs the baseband digital signals having the increased gains to the multi-IF converter 200 (step 440).

For example, when the DAC 300 has the frequency response as illustrated in FIG. 1, the baseband digital signal corresponding to the IF IF1 is amplified by 0.2 dB, the baseband digital signal corresponding to the IF IF2 is amplified by 0.8 dB, and the baseband digital signal corresponding to the IF IFn is amplified by 2.5 dB.

Figure 5:
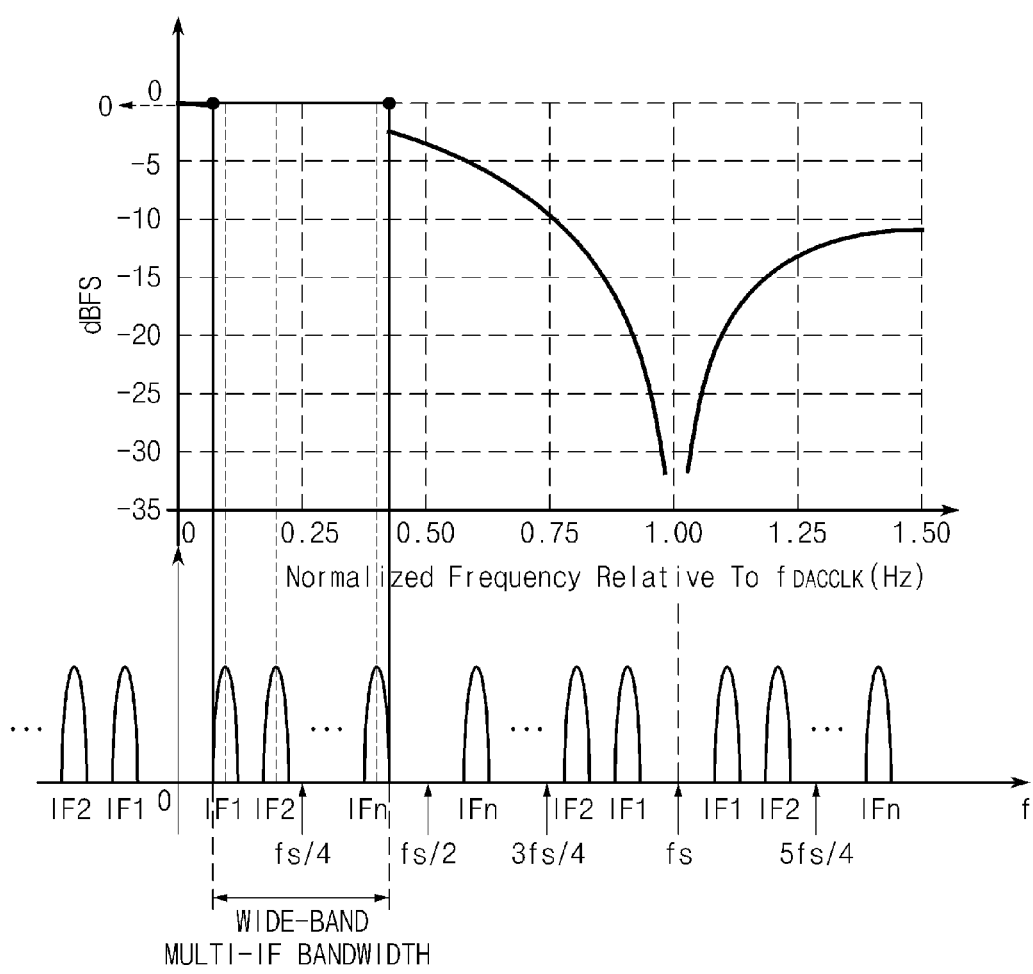
FIG. 5 is a diagram illustrating a frequency response characteristic depending on DAC sampling after controlling a transmission gain according to the present invention.

FIG. 5 is a diagram illustrating a frequency response characteristic depending on sampling of a DAC 300 after controlling a transmission gain according to the present invention.

The magnitudes of the baseband digital signals corresponding to the respective intermediate frequencies IFs IF1, IF2, ..., IFn are, in advance, amplified by the amounts to be attenuated by the DAC 300, and as a result, a previously amplified amount and the amount attenuated by the DAC 300 are offset. Therefore, the amplitudes of the frequency responses of the signals output from the DAC 300 are flattened as illustrated in FIG. 5.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. An apparatus for controlling a wide-band signal transmission gain, the apparatus comprising:
    a baseband processor generating a plurality of baseband digital signals and outputting the generated baseband digital signals by controlling gains of the generated baseband digital signals;
    a multi-intermediate frequency (IF) converter converting the plurality of baseband digital signals output from the baseband processor into digital IF signals and multiplexing the converted digital IF signals and outputting the multiplexed digital IF signals; and
    a digital-to-analog converter converting the multiplexed digital IF signals output from the multi-IF converter into analog IF signals, wherein
    the baseband processor controls the gains of the baseband digital signals according to an amplitude characteristic of a frequency response depending on a sampling scheme of the digital-to-analog converter.

2. The apparatus of claim 1, wherein the baseband processor individually controls gains of the baseband digital signals for each IF.

3. The apparatus of claim 2, wherein the baseband processor controls the gains of the baseband digital signals according to a characteristic of the digital-to-analog converter.

4. The apparatus of claim 3, wherein the baseband processor amplifies the baseband digital signals by attenuation amounts of the digital IF signals attenuated while passing through the digital-to-analog converter.

5. The apparatus of claim 1, wherein the baseband processor includes:
    a plurality of modems individually generating the plurality of baseband digital signals;
    a plurality of amplifiers corresponding to the plurality of baseband digital signals one to one and amplifying the corresponding baseband digital signals according to gain control signals; and
    a transmission gain controller generating the gain control signals according to the predetermined characteristic of the digital-to-analog converter and outputting the generated gain control signal to the amplifier.

6. The apparatus of claim 5, wherein the transmission gain controller generates the gain control signals according to the amplitude characteristic of the frequency response depending on the sampling scheme of the digital-to-analog converter.

7. The apparatus of claim 1, wherein the multi-IF converter allocates different IFs to the plurality of baseband digital signals and converts the corresponding baseband digital signals into digital IF signals.

8. A signal processing method of an apparatus for controlling a wide-band signal transmission gain, the method comprising:
    generating a plurality of baseband digital signals;
    controlling gains of the plurality of generated baseband digital signals;
    converting the baseband digital signals having the controlled gains into digital intermediate frequency (IF) signals;
    multiplexing the converted digital IF signals; and
    converting the multiplexed digital IF signals into analog IF signals, wherein
    in the controlling of the gains, the gains of the baseband digital signals are controlled according to an amplitude characteristic of a frequency response depending on a sampling scheme at the time of converting the multiplexed digital IF signals into analog IF signals.

9. The method of claim 8, wherein in the controlling of the gains, the gains of the baseband digital signals are individually controlled for each IF.

10. The method of claim 9, wherein in the controlling of the gains, the baseband digital signals are amplified by attenuation amounts attenuated at the time of converting the multiplexed digital IF signals into the analog IF signals.

* * * * *